(12) United States Patent
Bondu

(10) Patent No.: US 8,096,335 B2
(45) Date of Patent: Jan. 17, 2012

(54) TIRE FOR HEAVY VEHICLE

(75) Inventor: Lucien Bondu, La Roche Noire (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 418 days.

(21) Appl. No.: 12/517,730

(22) PCT Filed: Nov. 14, 2007

(86) PCT No.: PCT/EP2007/062310
§ 371 (c)(1),
(2), (4) Date: Jun. 4, 2009

(87) PCT Pub. No.: WO2008/068133
PCT Pub. Date: Jun. 12, 2008

(65) Prior Publication Data
US 2010/0065182 A1    Mar. 18, 2010

(30) Foreign Application Priority Data
Dec. 6, 2006    (FR) ...................................... 06 10698

(51) Int. Cl.
*B60C 9/18*    (2006.01)
*B60C 9/20*    (2006.01)

(52) U.S. Cl. .................. 152/535; 152/526; 152/536
(58) Field of Classification Search .................. 152/526, 152/535, 536
See application file for complete search history.

(56) References Cited

U.S. PATENT DOCUMENTS

| | | | |
|---|---|---|---|
| 3,789,989 A * | 2/1974 | Carson | 210/284 |
| 5,769,978 A * | 6/1998 | Lurois | 152/209.18 |
| 6,585,020 B2 * | 7/2003 | Bondu | 152/534 |
| 6,945,294 B2 * | 9/2005 | Jallais et al. | 152/534 |
| 2002/0007894 A1 | 1/2002 | Comps et al. | |
| 2004/0089391 A1 | 5/2004 | Jallais et al. | |
| 2004/0144469 A1 * | 7/2004 | Giraud et al. | 152/535 |

FOREIGN PATENT DOCUMENTS

| | | |
|---|---|---|
| FR | 2 791 001 A1 | 9/2000 |
| FR | 2 827 221 A | 1/2003 |
| JP | 06 143920 A | 5/1994 |
| JP | 2003 136911 A | 5/2003 |
| WO | WO 02/090135 A | 11/2002 |

* cited by examiner

*Primary Examiner* — Joseph Del Sole
*Assistant Examiner* — David N Brown, II
(74) *Attorney, Agent, or Firm* — Cozen O'Connor

(57) ABSTRACT

A heavy vehicle tire comprising at least four working plies formed of reinforcing elements which, from one ply to the next, cross one another, and comprising at least one protective ply. The tire is supplemented on each side of the circumferential mid-plane by a single working half-ply the reinforcing elements of which make an angle greater than 30° with the circumferential direction, the half-ply being radially on the inside of and adjacent to the radially outermost continuous working ply, its axially outer end being axially on the outside of the ends of the continuous working plies, and the reinforcing elements of the half-ply, the reinforcing elements of the radially outermost continuous working ply and the reinforcing elements of the protective ply the end of which is axially on the outside of the ends of the working plies being oriented in the same direction.

8 Claims, 2 Drawing Sheets

TIRE FOR HEAVY VEHICLE

RELATED APPLICATIONS

This is a U.S. national stage of application No. PCT/EP2007/062310, filed on 14 Nov. 2007.

This patent application claims the priority of French patent application no. 06/10698 filed Dec. 6, 2006, the disclosure content of which is hereby incorporated by reference.

FIELD OF THE INVENTION

The invention relates to a tire with a radial carcass reinforcement intended to be fitted to a heavy vehicle such as a transport vehicle or a civil engineering machine. This in particular is a tire with an axial width in excess of 37 inches.

BACKGROUND OF THE INVENTION

A tire such as this, generally intended to bear heavy loads, comprises a radial carcass reinforcement, and a crown reinforcement made up of at least two working crown plies, formed of inextensible reinforcing elements which, from one ply to the next, crossed one another making equal or unequal angles of between 10 and 45° with the circumferential direction.

The crown reinforcements of radial tires, especially as far as very large sized tires are concerned, are subjected to substantial deformations which give rise, between the edges of the crossed plies, to longitudinal and transverse shear stresses (the longitudinal shear is greater than the transverse shear when the cords of the crossed plies are at small angles to the circumferential direction), together with a delamination stress, a radial stress that has a tendency to separate the edges of the two plies radially. The said stresses are due primarily to the tire inflation pressure which means that the pressure known as the hoop pressure between the carcass reinforcement and the crown reinforcement tends to cause the said crown reinforcement to expand circumferentially. The said stresses are also due to the load borne by the tire under driving conditions, with the creation of a contact patch at the region of contact between the ground and the tire. The said stresses are also due to cornering on the tire during driving. These stresses generate cracks in the rubber compound adjacent to the end of the shortest ply, which cracks spread into the said compound to the detriment of the endurance of a crown reinforcement and therefore of the tire.

A marked improvement in the endurance has been afforded by the use, in the crown reinforcement, of at least one protective crown ply that has an axial width greater than the width of the axially widest working ply.

What "axial" means is a direction parallel to the axis of rotation of the tire and what "radial" means is a direction that intersects the axis of rotation of the tire and is perpendicular thereto. The axis of rotation of the tire is the axis about which it rotates in normal use. The circumferential mid-plane is a plane perpendicular to the axis of rotation of the tire and which divides the tire into two halves. A radial plane is a plane which contains the axis of rotation of the tire.

Another solution, as described in patent FR 2 421 742, is to distribute the stresses that as the tire undergoes cornering generate separation between working crown plies more favorably, by increasing the number of working plies.

Increasing the number of working plies is not without its disadvantages, particularly at the centre of the crown reinforcement where the number of plies has a direct impact on the bending rigidity of the crown of the tire. As this rigidity increases, it follows that impacts suffered by the crown of the tire, when driving over large stones for example, may lead to irreparable tire damage, as a result of this increased rigidity.

Patent application WO 00/54992 has also proposed, in order to avoid this disadvantage, creating a working crown reinforcement consisting of at least three continuous working plies and at least one half-ply, on each side of the circumferential mid-plane, positioned between the edges of at least two radially adjacent continuous working plies and the special feature of which is, in particular, that it makes an angle greater than 25° and between 5° and 15° greater than the largest of the angles of the continuous working plies, with the circumferential direction. The results obtained with this type of architecture have proved entirely satisfactory for the tire sizes tested, running over normal terrain.

SUMMARY OF THE INVENTION

One object of the present invention is to provide a tire crown architecture for heavy vehicles that makes it possible to obtain satisfactory endurance particularly when running under particularly harsh conditions involving, in particular, tortuous paths over stony ground.

This object has been achieved according to one aspect of the invention by a heavy vehicle tire, comprising a radial carcass reinforcement, radially surmounted by a working crown reinforcement, made up of at least four continuous working crown plies formed of reinforcing elements which, from one ply to the next, cross one another making the angles $\alpha_1$, $\alpha_2$, $\alpha_3$, $\alpha_4$ of between 5 and 30° with the circumferential direction, the working crown reinforcement being radially surmounted by a protective reinforcement made up of at least one ply of elastic metal reinforcing elements that make an angle $\gamma$ of between 10 and 30° with the circumferential direction, the end of the said protective ply being axially on the outside at the ends of the working plies, the working crown reinforcement being supplemented on each side of the circumferential mid-plane by a single working half-ply the reinforcing elements of which make an angle $\beta$ greater than 30° with the circumferential direction, the working half-ply being radially on the inside of and adjacent to the radially outermost continuous working ply, its axially outer end being axially on the outside of the ends of the continuous working plies, and the reinforcing elements of the working half-ply, the reinforcing elements of the radially outermost continuous working ply and the reinforcing elements of the protective ply the end of which is axially on the outside of the ends of the working plies being oriented in the same direction.

Orienting the reinforcing elements of the half-ply, the reinforcing elements of the radially outermost continuous working ply and the reinforcing elements of the protective ply the end of which is axially on the outside of the ends of the working plies in the same direction means, within the meaning of the invention, that the elements of each of these plies are oriented in the same way with respect to the circumferential direction of the tire; in other words, the angles formed between the circumferential direction and the reinforcing elements of these three plies are either all positive or all negative. By contrast, the magnitude of the angles may clearly differ from one ply to another.

Such a tire, that is to say which has a crown reinforcement as described, is able to improve the endurance of heavy vehicle tires. Indeed it has been found, particularly under the running conditions tested, that the proposed architectures appear to reduce the shear stresses at the edges of the tire and limit the risks of tire degradation particularly at the ends of the axially widest plies, thus improving tire endurance.

The combination of a working half-ply axially wider than the four continuous working plies, all surmounted by a protective ply the end of which is axially on the outside of the ends of the working plies, such that the angles of the reinforcing elements of the half-ply, of the continuous working ply and of the protective ply are oriented in the same direction, leads to this improvement in tire endurance according to the invention under particularly harsh running conditions. Indeed, the identical orientation of the reinforcing elements of the radially outermost working ply and of the protective ply unexpectedly leads to an improvement in tire endurance even though there is no cross-bracing created by these two plies.

According to a preferred embodiment of the invention, the half-ply radially covers the ends of the continuous working crown plies that lie radially on the inside thereof.

Again as a preference, one continuous working ply is axially wider than the continuous working ply radially on the inside of and adjacent to it. In other words, the axial width of the continuous working plies increases with separation, in the radial direction, from the carcass reinforcement.

According to these preferred embodiments of the invention, the overlapping of the ends of the continuous crown plies by the half-ply and the arrangement of the various continuous working plies improve the load distribution through the entire crown reinforcement, thereby optimizing ply couplings.

The continuous plies and the working crown half-plies are preferably made up of inextensible metal reinforcing elements, so as to hoop the carcass reinforcement as effectively as possible.

Advantageously, according to an embodiment of the invention, the reinforcing elements of the half-ply have an angle β that is at least 10° greater than the smallest of the angles $\alpha_1$, $\alpha_2$, $\alpha_3$, $\alpha_4$.

A ply such as this is able in particular to limit shear between the reinforcements of the said ply and shear against the rubber surrounding the said ply, thus limiting the risks of the plies cleaving apart.

An advantageous alternative form of the invention is for at least the reinforcing elements of the two continuous working plies radially closest to the carcass reinforcement to make angles $\alpha_1$, $\alpha_2$ smaller than 12° and preferably smaller than 8° with the circumferential direction.

Such an alternative form of embodiment of the invention particularly makes it possible to afford stability as far as any changes in tire profile resulting from operation and high temperatures are concerned.

In a way known per se, particularly in order to improve the resistance of the tire to cutting and puncturing, the protective reinforcement is advantageously made up of at least two plies of elastic metal reinforcing elements. Alternative forms of embodiment of the invention provide protective plies made up of partially overlapping strips. Whatever the type of protective ply used, the elastic reinforcements used may be elements arranged in a straight line or in a sinusoidal form.

As a preference, the radially inner protective ply is axially wider than the working plies.

As a further preference, the reinforcing elements of the protective plies cross one another.

BRIEF DESCRIPTION OF THE DRAWINGS

Further details and advantageous features of the invention will become evident hereinafter from the description of some exemplary embodiments of the invention made with reference to FIGS. 1 and 2 which depict.

DETAILED DESCRIPTION OF THE DRAWINGS

For ease of understanding, the figures are not drawn to scale. The figures depict only half of the architectures which continue symmetrically with respect to the axis XX' which represents the circumferential mid-plane of a tire.

The dimensional values quoted are theoretical values, that is to say reference values used in tire manufacture; the actual values may differ slightly particularly as a result of uncertainties connected with the manufacturing method for this type of tire.

Further, as far as the angles of the reinforcements of the plies are concerned, the values quoted are minimum values, that is to say the values corresponding to the region of a ply closest to the median axis of the tire. What happens is that the angle of the said reinforcements varies in the axial direction of the tire, particularly as a result of the curvature of this tire.

Figure 1:
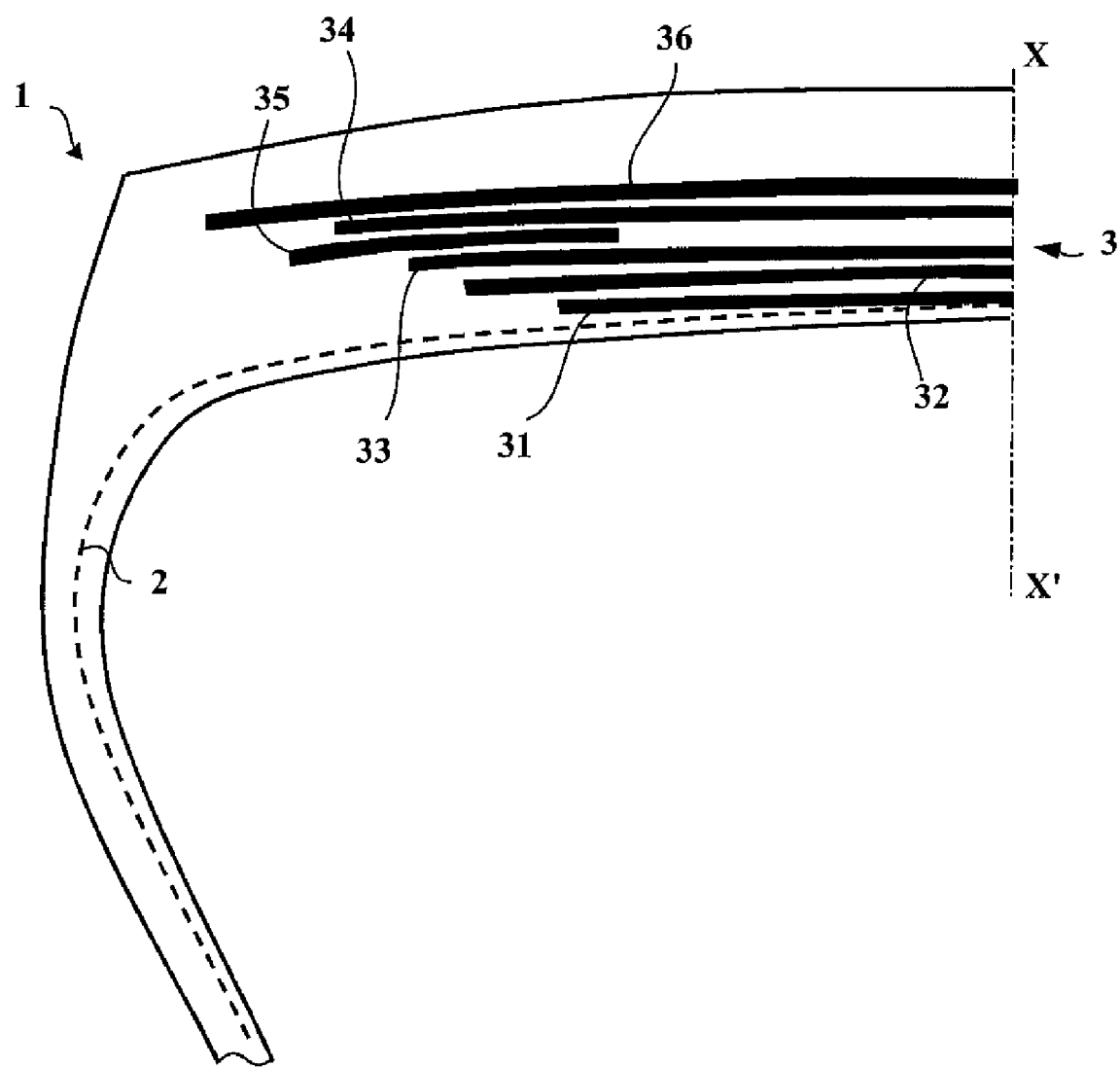
FIG. 1: a schematic depiction of a tire according to a first embodiment of the invention.

FIG. 1 depicts a radial section through a tire 1 produced according to the invention. The tire 1, of size 59/80R63, comprises a carcass reinforcement 2 anchored in two beads, not depicted in the figures. This carcass reinforcement 2 is hooped by a crown reinforcement 3, formed radially, from the inside outwards:

of a first ply 31 formed of inextensible metal cords oriented at an angle $\alpha_1$ of 24° with respect to the circumferential direction, the ply 31 having a width of 600 mm, of a second ply 32 formed of inextensible metal cords oriented at an angle $\alpha_2$ of 24° with respect to the circumferential direction and which cross the metal cords of the layer 31; the ply 32 has a width of 720 mm and is therefore axially wider than the ply 31, of a working ply 33 formed of metal cords oriented at an angle $\alpha_3$ of 24° with respect to the circumferential direction and which cross the metal cords of the ply 32. The ply 33 is axially wider than the ply 32 and is 820 mm wide, of a half-ply 35 formed of metal cords oriented at an angle β of 35° with respect to the circumferential direction and which cross the metal cords of the ply 33. The axial width of the half-ply 35 is 250 mm. Its axially inner end is axially on the inside of the end of the ply 31, of a working ply 34 formed of metal cords oriented at an angle $\alpha_4$ of 24° with respect to the circumferential direction and which cross the metal cords of the ply 33. The metal cords of the ply 34 are therefore oriented in the same direction as the metal cords of the half-ply 35. The ply 34 has a width of 950 mm and is therefore axially wider than the ply 33, of a protective ply 36 formed of extensible metal cords oriented at an angle γ of 24° with respect to the circumferential direction, in the same direction as the metal cords of the ply 34. The metal cords of the ply 36 are therefore also oriented in the same direction as the metal cords of the half-ply 35. The ply 36 has a width of 1200 mm.

The cords which, under a tensile force equal to the failure load, exhibit a relative elongation of at least 4% are said to be elastic, whereas cords exhibiting a relative elongation of less than 0.2% measured at 10% of the breaking force are said to be inextensible.

Figure 2:
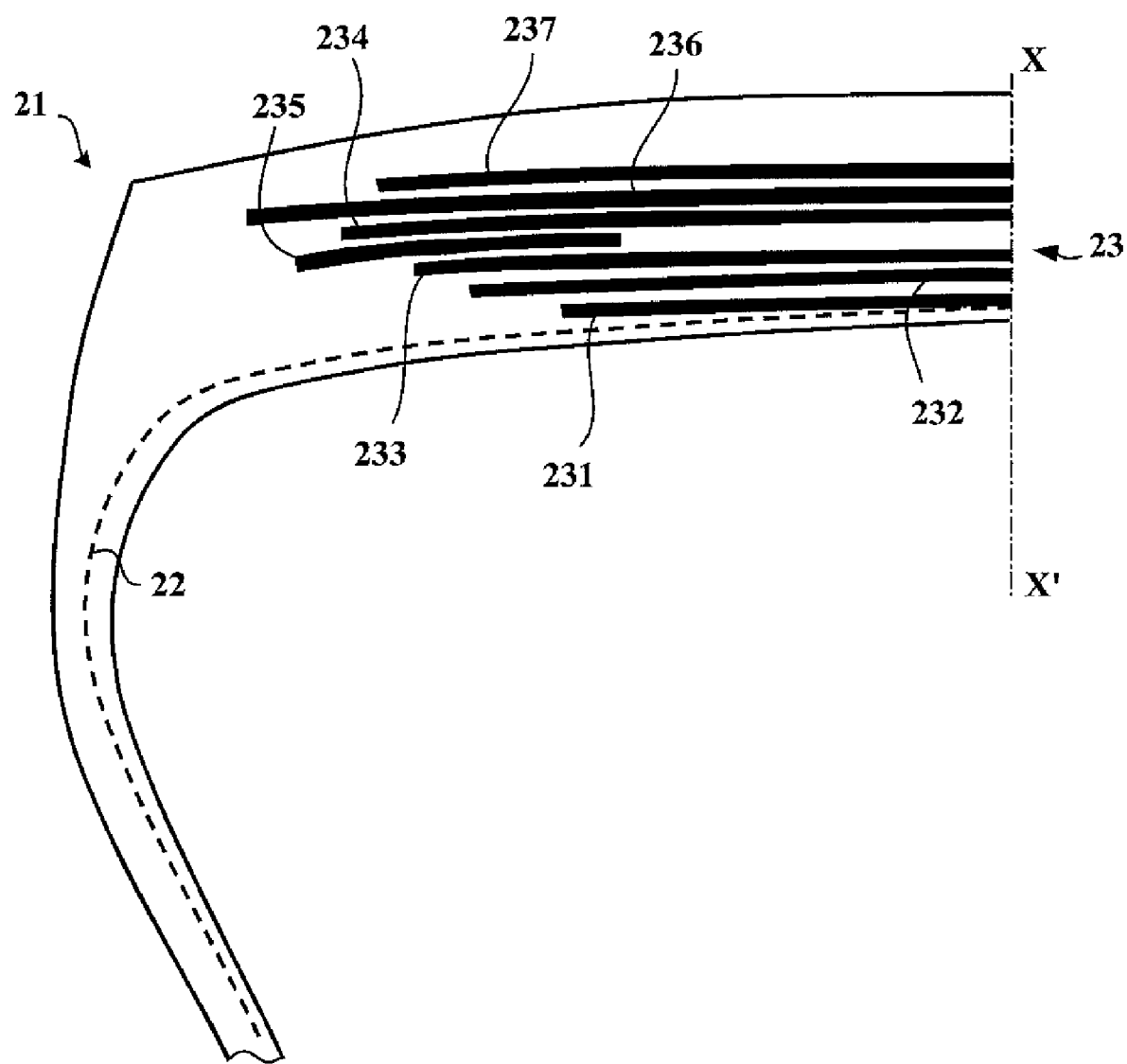
FIG. 2: a schematic depiction of a tire according to a second embodiment of the invention.

FIG. 2 illustrates a second alternative form of embodiment of the invention. The tire 21 differs from that of FIG. 1 firstly in that the angles $\alpha_1$ and $\alpha_2$ of the reinforcing elements of plies 231 and 232 are equal in terms of absolute value, at 5°, the reinforcing elements remaining crossed from one ply to the next.

Secondly, the tire 21 comprises a second protective ply 237 the reinforcing elements of which make an angle of 24° with the circumferential direction and cross the reinforcing elements of the radially inner protective ply 236.

The axially outer end of the narrowest protective ply 237 lies between the axially outer ends of the half-ply 235 and the end of the protective ply 236. The protective ply 237 has a width of 920 mm.

Comparative tests were performed on the basis of the tire shown in FIG. 1. The comparison was performed using a reference tire that was identical except that it did not have the half-plies 35 and that the reinforcing elements of the protective ply 36 were crossed with the reinforcing elements of the working ply 34.

The tires were tested on the same vehicle, this vehicle following the same route simulating a path that is very detrimental to tires, and driven by the same driver.

The tests confirmed, after driving over a distance of 8000 km, that the tires according to the invention displayed no signs of the start of damage whereas an examination of the reference tires revealed the onset of cracks.

These exemplary embodiments should not be interpreted limitingly as there are numerous alternative forms of embodiment; in particular, it is possible to have a greater number of continuous working plies.

According to other alternative forms of embodiment, the invention also makes provision for the radial order of the two protective plies to be reversed, it then being possible for the cords of the said plies to cross one another or alternatively to be oriented in the same direction. By reversing the order of the two protective plies according to the invention it would be understood that the invention makes provision for swapping the widths of the said protective plies. The radially inner protective ply can thus be the axially narrowest protective ply.

The invention claimed is:

1. A heavy vehicle tire, comprising a radial carcass reinforcement, radially surmounted by a working crown reinforcement, made up of at least four continuous working crown plies formed of reinforcing elements which, from one ply to the next, cross one another making the angles $\alpha_1$, $\alpha_2$, $\alpha_3$, $\alpha_4$ of between 5 and 30° with the circumferential direction, the working crown reinforcement being radially surmounted by a protective reinforcement made up of at least one ply of elastic metal reinforcing elements that make an angle $\gamma$ of between 10 and 30° with the circumferential direction, the end of the said protective ply being axially on the outside at the ends of the working plies, wherein the working crown reinforcement is supplemented on each side of the circumferential mid-plane by a single working half-ply the reinforcing elements of which make an angle $\beta$ greater than 30° with the circumferential direction, wherein the working half-ply is radially on the inside of and adjacent to the radially outermost continuous working ply, wherein its axially outer end is axially on the outside of the ends of the continuous working plies, and wherein the reinforcing elements of the working half-ply, the reinforcing elements of the radially outermost continuous working ply and the reinforcing elements of the protective ply the end of which is axially on the outside of the ends of the working plies are oriented in the same direction.

2. The tire according to claim 1, wherein the working half-ply radially covers the ends of the continuous working crown plies that lie radially on the inside thereof.

3. The tire according to claim 1, wherein one continuous working ply is axially wider than the continuous working ply radially on the inside of and adjacent to it.

4. The tire according to claim 1, wherein the continuous plies and the working half-plies are made up of inextensible metal reinforcing elements.

5. The tire according to claim 1, wherein the reinforcing elements of the working half-ply have an angle $\beta$ that is at least 10° greater than the smallest of the angles $\alpha_1$, $\alpha_2$, $\alpha_3$, $\alpha_4$.

6. The tire according to claim 1, wherein at least the reinforcing elements of the two continuous working plies radially closest to the carcass reinforcement make angles $\alpha_1$, $\alpha_2$ smaller than 12° and preferably smaller than 8° with the circumferential direction.

7. The tire according to claim 1, wherein the protective reinforcement is made up of at least two plies of elastic metal reinforcing elements.

8. The tire according to claim 7, wherein the protective reinforcement is made up of at least two plies of elastic metal reinforcing elements that from one ply to the next cross one another.

* * * * *